Patented Oct. 22, 1929

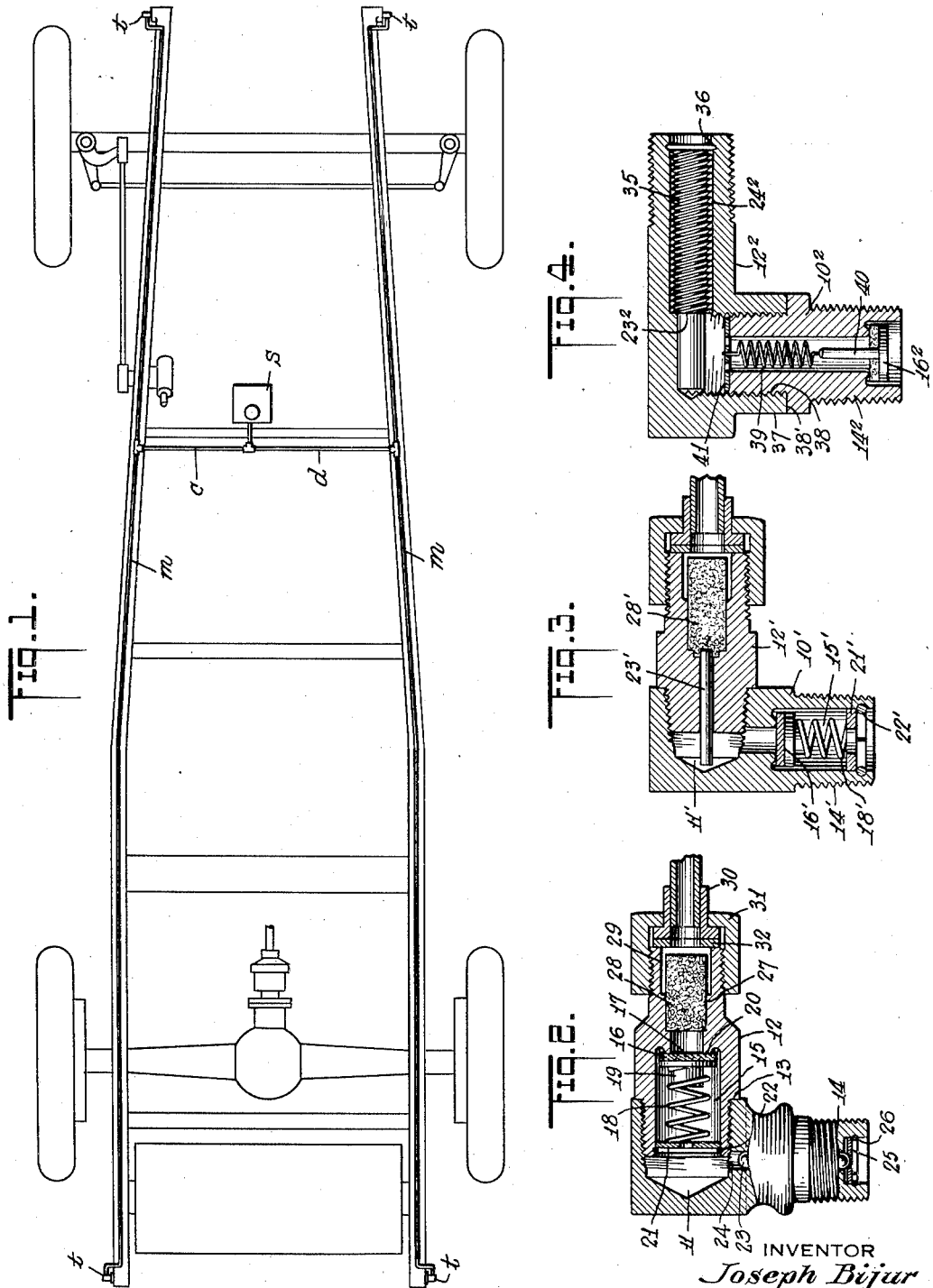

1,732,828

UNITED STATES PATENT OFFICE

JOSEPH BIJUR, OF NEW YORK, N. Y., ASSIGNOR TO AUTO RESEARCH CORPORATION, A CORPORATION OF DELAWARE.

FLOW-CONTROL FITTING

Original application filed August 9, 1922, Serial No. 580,668. Divided and this application filed June 5, 1928. Serial No. 282,958.

My present invention relates primarily to chassis lubrication and is more especially concerned with flow control devices of the general type disclosed in my issued Patent No. 1,632,772 of June 14, 1927, and known as "drip plugs," the flow rating of which is not subject to fortuitous variation.

It is an object of the invention to provide a drip plug of the above type of compact construction which is not easily tampered with, but may be conveniently taken apart and put together when desired in the course of manufacture.

Another object is to provide a fitting of the above type, which permits of easily assembling, cleaning or clearing the restriction without interference by the valve.

Another object is to provide a fitting of the said type which permits of testing the valve for tightness without interference from the restriction element.

Another object is to avoid the need for rejecting the entire fitting where only the valve or only the restriction is found defective during the process of manufacture and inspection.

The objects of the invention are accomplished by forming the drip plug of two coacting separable fitting parts, one of which embodies the flow controlling restriction. Preferably, one of the fitting parts has a nipple end adapted to be applied to the bearing, with the outer portion of which fitting part, the coacting inlet fitting part has a plug and socket connection, and to which the feed pipe extremity is connected. The restriction may be a filler of metal or other hard material, within a corresponding bore longitudinally of one of the fitting parts, producing a high resistance crevice of length and cross-section determining a definite rate of flow with oil of a given viscosity, under a given propulsive pressure.

This application is a division of my copending application Serial No. 580,668, filed August 9th, 1922.

In the accompanying drawings in which are shown one or more of various possible embodiments of the several features of the invention, Fig. 1 is a diagrammatic view indicating the application of the fitting to a chassis.

Fig. 2 is a transverse sectional view on a larger scale showing the construction of one embodiment of the fitting.

Fig. 3 is a view similar to Fig. 2 of another embodiment of drip plug and

Fig. 4 is a view similar to Figs. 2 and 3 of still another embodiment.

Referring now to the drawings, I have shown diagrammatically the general layout of the chassis of an automobile having a lubricant supply unit S, illustratively on the dashboard. The distributing system includes headers $c$ and $d$, which communicate at their ends with the respective mains $m$ extending the length of the channel frames and feeding various bearings at or near which the drip plug terminals $t$ are applied. Bridging conduits (not shown) are provided leading to similar drip plugs (not shown) at or near the corresponding bearings on the axle or other unsprung parts.

The fitting of Fig. 2 is shown elbow-shaped and comprises a support element 10 provided with a transverse socket 11 into which is threaded an inlet fitting or cartridge 12 which illustratively extends at right angles to the support. The support is formed preferably of square or polygonal stock whereby the end area of shoulder 13 on the cartridge will contact one of the flat sides. The support has a threaded nipple 14 for insertion into a bearing, bolt or other part to be lubricated.

The cartridge element 12 is shown with a bore 15 of large diameter for mounting the disk valve 16 which is preferably of diameter substantially as large as the fitting admits of and is provided with a seating portion 17 of a material which should be yielding to compensate for irregularities in the seat, smooth to seat completely under light pressure, substantially impervious and chemically inert to oil and non-sticking. A spring 18 coiled at its inner end about a lug 19 on the valve urges the latter against its seat 20, said spring reacting against a perforated plate 21 held in place in the inner part of the cartridge by a split ring 22.

In the present embodiment, the flow restriction is disposed in the base or stem fitting. It is illustratively shown as a metallic filler snugly fitting within a corresponding longitudinal bore 24 in the support element to effect a resistance to flow equivalent to that of the wire filler in my issued patent. The inner end of the cartridge 12 extends partly across the inner end of the bore 24, and a perforated disk 25 is retained in place by a split ring 26 at the bearing end of the support, thus positively preventing escape of the restriction filler.

The inlet end of the cartridge 12 preferably has a socket 27 within which is fitted a felt strainer plug 28 the inner end of which fits snugly therein while the outer end is preferably loose or spaced from the wall of the corresponding socket portion 29 of somewhat enlarged diameter as shown.

The end of the pipe line is connected to the drip plug by a suitable coupling. Illustratively a flanged collar 30 is soldered to the pipe line and clamped against the end of the fitting by a screw cap 31 threaded thereon, an interposed gasket 32 effecting a fluid tight connection.

In operation when the drip plug is subjected to pressure applied to the distributing system shown in Fig. 1, the valve 16 will open and the oil is forced past the restriction filler so that the oil emerges from the fitting slowly drop by drop.

The drip plug has a fixed resistance to flow, maintained invariant by the strainer plug 28 which intercepts any solid particles that might clog the minute crevice or become seated at the valve.

The embodiment of Fig. 3 shows an elbow fitting similar to that of Fig. 2 with a support element 10' threaded into the bearing and a cartridge 12' threaded into a socket 11' near the outer end of the support. Unlike the embodiment of Fig. 2, the valve is here shown mounted in the support element and the restriction member in the inlet cartridge element. The support element in this instance accordingly has a bore 15' sufficiently large for mounting the disk valve 16' which is of construction similar to that of Fig. 2. The seating spring 18' for the valve in this case reacts against a perforated washer 21' near the outer or base end of the support, and is maintained in place by a split ring 22'. The drip plug restriction is shown as a filler 23' of metal wire within the axial bore of the inlet cartridge 12'. The bore is preferably about $\frac{1}{16}$" in diameter and about an inch long and the wire filler about .002" smaller in diameter, fits closely, leaving but a minute restricted annular crevice or passage about the length of the wire. The feed pipe may be coupled to the inlet in the same manner as in the embodiment of Fig. 2 and a similar strainer may be provided. The restriction pin is maintained in place by the strainer 28' at one end thereof and by the bottom of the socket 11' at the other end thereof.

In the embodiment of Fig. 4 I have shown a restriction illustratively also in the cartridge element as in Fig. 3 but formed by tightly fitting a plug of metal or other hard material in a corresponding axial bore of the fitting, linear clearance being provided at the surface of contact to afford a highly restricted flow pressure absorbing crevice. In the illustrative embodiment shown, there is employed a helical restriction of length far greater than the fitting piece. The restriction is determined by cutting a thread of a multiplicity of turns, preferably a double or triple thread, in the contacting surface between the fitting bore and the plug therein, the apex of the thread being in tight engagement with the relatively smooth surface of the unthreaded member. In the embodiment shown, it is the plug $23^2$ which is threaded at $35$ and the bore $24^2$ of the fitting piece $12^2$ which has a relatively smooth wall. The diameter of the plug and the bore of the fitting are considerably larger than the corresponding elements of Figs. 2 and 3, affording a greater length of helix than would a small plug or pin in a corresponding bore. The plug $23^2$ is preferably of diameter in the order of that of the inlet 36 to the drip plug. The inlet is of cross-sectional area many times as great as that of the long helical restriction passage.

In the present embodiment, the fitting piece $12^2$ which forms the restriction, is illustratively provided with a socket 37 threaded upon the upper nipple end 38 of the fitting piece $10^2$, applied to the bearing. The piece $10^2$ has a shoulder 38' against which the end of socket 37 abuts when the parts are correctly assembled.

The fitting piece $10^2$ also serves as the mount for the check valve $16^2$ of construction and proportions similar to those of the embodiment of Fig. 2. Illustratively valve $16^2$ is seated by a tension rather than a compression coil spring. Tension spring 39 is affixed at one end to an integral stem 40 on the valve and is secured at its opposite end to a washer 41. The spring draws the washer downward against the upper nipple end of the fitting piece $10^2$ and the valve upward against its seat.

It is obvious that the restriction fitting pieces 10 and $12^2$ respectively of Figs. 2 and 4 may be made with restriction plugs of different length or rating, and the fitting assembled by connection of the valve fitting piece 12, $10^2$ which is universal to fittings of all ratings. In use, should a fitting be found to flow too freely or too slowly the restriction fitting part may be readily replaced by one of appropriate rating. In similar manner, the constituent fitting parts of the embodiment of Fig. 3 may be separated and in this case, the restriction pin 23' merely need be replaced by one of appropriate effective length.

Each of the embodiments presents a compact fitting in which the length even of the mounting nipple 14, 14', 14² that is inserted into the bearing, serves to accommodate some of the flow controlling parts of the drip plug. In Fig. 2 the length of the restriction 23 extends into the mounting nipple; in Figs. 3 and 4, the valve or the seating spring thereof is there accommodated. Moreover the elbow shape of the drip plug illustratively shown provides a construction protruding but little from the bearing structure to which it is applied, and when used on an automobile is less likely to be knocked off than if the constituent fitting parts of a similar drip plug were axially aligned. The elbow form moreover presents the advantage that the inlet nipple extends in the general direction in which the feed pipe is ordinarily disposed so that the length of the latter need not be bent at a sharp angle for application of the coupling.

Each of the embodiments of drip plug is readily installed at the bearing as a complete preassembled unit. Each bearing when equipped with a drip plug of appropriate rating will receive an accurately predetermined proportion of the output feed from a common source of lubricant and pressure, and this substantially regardless of the viscosity or fluidity of the lubricant. Each drip plug will respond promptly to the application of pressure to the feed pipe line, and the valve thereof will close promptly to arrest flow or leak upon the discontinuance of operating pressure.

In installing the drip plug or removing it from a bearing it is the polygonal stem or base section which is naturally grasped so that there is no likelihood in such operation of inadvertently disassembling the drip plug, and deliberate separation of the fitting elements with the ordinary tools available to an inexpert layman is difficult. The manufacturer however can readily separate these parts and put them together again when desired, in the course of manufacture.

The two-part arrangement of drip plug facilitates manufacture and permits of cleaning or clearing the restriction in its distinct fitting part prior to assembly with the other fitting part, both ends of the restriction being at that time exposed, to permit ejection of chips. The valve also may be tested for tightness in its distinct fitting element without interference from the restriction. By this arrangement the losses due to rejections are reduced to the utmost, because a defect in one element does not involve rejection of the other element.

It will be understood that the valve arrangement of Fig. 4 may be applied to advantage in the embodiments of Figs. 2 and 3 and conversely the valve of the latter figures may be employed in the drip plug of Fig. 4. Likewise the specific flow restriction construction of each of the three embodiments shown may be interchangeably used in each of the other embodiment of drip plug.

The subject-matter specific to the drip plug of Fig. 3 is claimed in a copending application Serial No. 395,258, filed September 26, 1929; the subject matter specific to the drip plug of Fig. 4 is claimed in a copending application, Serial No. 282,959, filed June 5, 1928, and the specific construction of restriction filler only generally suggested in the embodiment of Fig. 2 is made the subject-matter of another copending application, Serial No. 380,156, filed July 22, 1929.

I claim:—

1. A drip plug construction comprising a pair of rigid pieces correlated to provide a restriction fitting, affording a highly resistant passage longitudinally thereof, said passage accessible through each of the ends of said restriction fitting and a complementary fitting for associating said restriction fitting in an installation, said complementary fitting covering one end of the restriction passage exposed in the separate restriction fitting.

2. A drip plug construction comprising a pair of rigid pieces closely fitted together to provide a pre-assembled restriction fitting, affording a highly resistant passage, said pre-assembled fitting being open at each of the ends of said passage, a complementary fitting piece for associating said restriction fitting in an installation, said complementary piece covering one end of the restriction passage exposed in the separate restriction fitting.

3. A drip plug construction comprising a restriction fitting piece having a hard imperforate restriction insert closely fitting in a corresponding longitudinal bore which breaks through the fitting piece at its opposite ends, and affording a highly restricted outlet, and a complementary fitting piece for associating said restriction piece in a lubricating installation, said complementary piece covering one end of the restriction passage exposed in the separate restriction fitting piece.

4. A drip plug comprising a restriction fitting having a nipple adapted for application at a bearing, an imperforate hard insert closely lodged in a corresponding bore longitudinally through the length of the nipple, and pre-assembled therewith to afford a highly restricted outlet, said restriction passage accessible through the inlet end thereof for facility in cleaning or clearing, and a complementary fitting having a plug and socket connection with the inlet end of said restriction fitting, and covering the otherwise exposed inlet end of said restriction passage, said complementary fitting affording a coupling connection for the extremity of a feed pipe.

5. A drip plug construction comprising a pair of fitting elements having a plug and socket connection, one of said elements having means at the end thereof for application of a feed pipe thereto, and one of said elements having a restriction member disposed therein, the other of said elements having a check valve therein.

6. A drip plug construction comprising a pair of fitting elements having a plug and socket connection therebetween, one of said elements having a valve therein and having means at the end thereof for application of a feed pipe thereto, the other member having restriction means of hard material closely fitting in a corresponding bore thereof.

7. A drip plug construction including a pair of pipe fitting elements, having a threaded plug and socket connection, one of said elements having a strainer at the inlet thereof, and having means for application of a feed pipe thereto, a filler in one of said elements, serving as a flow restriction, and a check valve in the other of said elements.

8. A drip plug construction comprising a pipe fitting having a nipple end adapted to be applied to a bearing, a socket near the opposite end of said fitting, a second fitting having a nipple threaded into said socket, a strainer at the inlet of said second fitting, coupling connecting means for applying a feed pipe to the latter, a solid restriction member extending longitudinally of one of said fittings, and a check valve within the other of said fittings.

9. A drip plug construction comprising a mounting fitting having a nipple adapted to be applied to a bearing, a restriction member of hard material snugly extending into a corresponding longitudinal bore in the nipple of said fitting, an inlet fitting having a nipple threaded into a socket at the outer end of said mounting fitting and having coupling connecting means at the inlet end thereof for a feed pipe, said inlet fitting comprising a valve pre-assembled therewith.

10. A drip plug comprising a pipe fitting having a polygonal cross-section and having a nipple adapted to be applied to a bearing, a second pipe fitting connected to the outer end of said first element by a plug and socket connection, a flow restriction member in one of said fitting parts, closed at its end by the other fitting part, and a valve enclosed in the latter element.

11. A drip plug construction, comprising a mounting fitting having a threaded nipple adapted to be applied to a bearing, a solid restriction member snugly extending into a corresponding axial bore of said nipple, an inlet fitting threaded into a socket at the outer end of said mounting fitting and having coupling connecting means at the inlet end thereof for a feed pipe, said inlet fitting comprising a valve preassembled therewith and a strainer at the inlet end of said drip plug, the fitting parts in assembled condition enclosing the parts of the restriction and of the valve exposed in the separate fitting parts.

12. A drip plug comprising a support fitting of polygonal stock and having a nipple adapted for application to a bearing, a flow restriction member of hard material snugly fitting in a corresponding longitudinal bore through said fitting and the nipple thereof, an inlet cartridge including a nipple threaded into a corresponding socket at the outer end of said support fitting and having a shoulder abutting a flat side of said base fitting, said inlet cartridge having a valve seat formed as an integral part thereof, and a valve coacting therewith.

13. A drip plug comprising a pipe fitting having a flow restriction therein and a protective strainer comprising a wad of fibrous material snugly fitted in a corresponding socket near the inlet end of said fitting and spaced from the wall of said socket at the outer end thereof.

14. A drip plug construction comprising a pair of fitting elements extending in angular relation and having a plug and socket connection, one of said fitting elements adapted to be applied to a bearing and the other having means at the end thereof for application of a feed pipe thereto, a solid flow controlling restriction in one and a check valve in the other of said elements.

15. A drip plug construction comprising a pair of fitting elements extending in angular relation and having a plug and socket connection, one of said elements having a valve therein and means at the end thereof for application of a feed pipe thereto, the other of said elements having a solid flow controlling restriction retained in a corresponding longitudinal bore thereof.

16. A drip plug construction comprising a support fitting having a nipple adapted to be applied at a bearing, and having a solid flow restriction snugly fitting in a corresponding bore longitudinally thereof, said fitting having a laterally extending socket therein, a second fitting plugged into said socket and having means at the end thereof for application of a feed pipe thereto, said second fitting having a valve therein, pre-assembled therewith.

Signed at New York in the county of New York and State of New York this 25th day of May, A. D. 1928.

JOSEPH BIJUR.